United States Patent [19]

Bennett et al.

[11] Patent Number: 5,738,189
[45] Date of Patent: Apr. 14, 1998

[54] ADJUSTMENT MECHANISM FOR DISC BRAKE, WITH IMPROVED OVER-TORQUE CLUTCH

[76] Inventors: John L. Bennett, 952 Wesley Dr., Troy, Mich. 48098; Mark L. Frost, 2945 Fox Hill Dr., Sterling Heights, Mich. 48310

[21] Appl. No.: 808,539

[22] Filed: Feb. 27, 1997

[51] Int. Cl.$^6$ .................................................. F16D 65/38
[52] U.S. Cl. .............................. 188/196 BA; 188/196 D; 188/72.9
[58] Field of Search ........................... 188/71.7, 71.8, 188/71.9, 72.7, 72.8, 72.9, 79.56, 196 D, 196 BA, 106 F

[56] References Cited

FOREIGN PATENT DOCUMENTS 0703380  9/1994  European Pat. Off. .

Primary Examiner—Robert J. Oberleitner
Assistant Examiner—Chris Schwartz

[57] ABSTRACT

An adjustment mechanism for advancing the backing plate and friction material of a disc brake includes an over-torque clutch that provides a positive connection between inner and outer over-torque clutch members. In a preferred embodiment, spherical balls are forced into holes in both the inner and outer over-torque clutch members to allow rotation to be transmitted between inner and outer over-torque members. If the torque load exceeds a predetermined limit, then the balls move out of holes in at least one of the inner and outer over-torque clutch members. The spring force is preferably an axial force applied by a wave spring, which forces a washer to bias a plurality of balls into the holes.

17 Claims, 2 Drawing Sheets

ADJUSTMENT MECHANISM FOR DISC BRAKE, WITH IMPROVED OVER-TORQUE CLUTCH

BACKGROUND OF THE INVENTION

This invention relates to improvements for an over-torque clutch incorporated into an adjustment mechanism for a disc brake.

Disc brakes are utilized to apply braking force to vehicles. In one known type of disc brake, an eccentric member rotates upon receiving an actuation force from a disc brake control. When the eccentric mechanism rotates it drives a sleeve to bring the backing plate and an associated friction surface into contact with a rotating disc.

With wear, the friction material begins to be spaced further from the disc. The prior art has proposed adjustment mechanisms which move the friction material closer to the wheel hub with wear. In one known adjustment mechanism, rotation of the eccentric member also rotates an adjustment member. The adjustment member in turn rotates an outer clutch member. The outer clutch member is connected to an inner clutch member through an over-torque connection. The inner clutch member is associated with a central gear through a one way clutch. The central gear in turn drives a gear transmission, which drives adjustment sleeves. The adjustment sleeves turn structure which advances the friction material closer to the rotating disc. In this way, when the eccentric member is rotated, the friction material is brought forwardly to accommodate wear.

The over-torque clutch insures that the friction material is not advanced to an undesirable extent. Once the friction material is in contact with the rotating disc, further advancement of the friction material would be undesirable. If the friction material is advanced further while in contact with the rotating hub, the torque load on the over-torque clutch exceeds the predetermined torque load. The clutch then allows relative movement and prevents further advancement of the friction material. In this way, undesirable advancement of the friction material due to the adjustment mechanism is avoided. When the eccentric member is released and returns to a non-braking position, the one-way clutch allows the return without further advancement. The structure described to this point is known.

In one recent proposal by the assignee of the present invention, the adjustment mechanism is actuated by a gear toothed member engaging gear teeth on the outer over-torque clutch member. The over-torque clutch is provided by a plurality of balls which are spring biased radially outwardly from the inner over-torque member and into grooves at an inner peripheral bore of the outer over-torque clutch member. When the balls are received in the grooves, the outer over-torque member rotates the inner over-torque member. A friction force transmits the rotation. If the torque load exceeds the spring force then the balls move out of the grooves and the outer over-torque member rotates relative to the inner over-torque member, such that there is no undue advancement.

SUMMARY OF THE INVENTION

In a disclosed embodiment of this invention, an improvement to the over-torque mechanisms described above includes a plurality of members axially biased to connect the inner and outer over-torque members for rotation. Should the load on this connection exceed a predetermined torque limit, then the members move to allow the inner and outer over-torque members to rotate relative to each other.

In one preferred embodiment of this invention, the members are balls spring biased by a spring to be received in openings in both of inner and outer over-torque members. Since the balls are actually received in the openings, it is not a friction force which connects the inner and outer over-torque clutch members. Instead, it is the presence of the balls themselves that transmit rotation between the inner and outer over-torque clutch members. This may provide more reliable rotation in certain circumstances. Further, this arrangement requires a smaller radial space for the over-torque connection.

Should the force between the inner and outer over-torque clutch members exceed the predetermined torque load, then the balls are forced outwardly of the holes to allow relative rotation between the members. In a preferred embodiment, the balls ride in holes formed in a radially outwardly extending disc in the inner over-torque clutch member. The spring selectively biases the balls into holes which are drilled in the outer over-torque clutch member. The outer over-torque clutch member holes preferably have an inner diameter which is somewhat less than the outer diameter of the balls. In this way, the balls are only partially received in the holes.

These and other features of the present invention can be best understood from the following specification and drawings, of which the following is a brief description.

DETAILED DESCRIPTION OF THE PREFERRED EMBODIMENT

Figure 1:
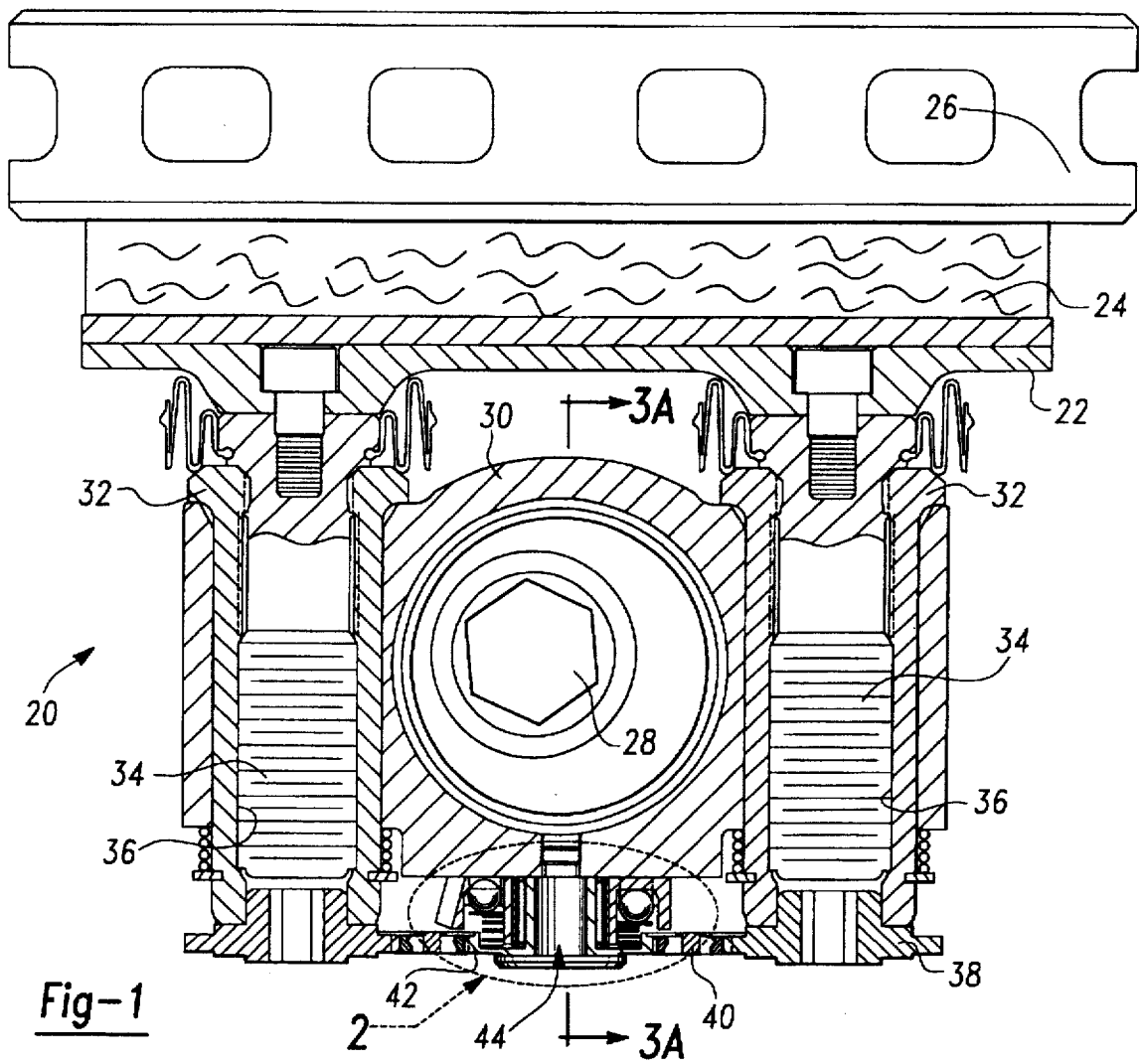
FIG. 1 is a view of a disc brake system incorporating the inventive clutch.

A disc brake system 20 is illustrated in FIG. 1. The disc brake system 20 shown is disclosed in co-pending U.S. application Ser. Nos. 08/747,141 and 08/747,139, which are co-owned by the assignee of the present invention. The inventive aspects of this Application relate to an improved clutch mechanism as will be disclosed below. However, a brief understanding of the operation of the brake system 20 is necessary to understand the function of the inventive clutch.

As shown, a backing plate 22 carries a friction material 24 into contact with a rotating member 26. Rotating member 26 is associated with a wheel which is to be braked by the disc brake system 20. By bringing friction material 24 into contact with member 26, the rotation of the wheel may be slowed.

To move the friction material 24 into contact with member 26, an eccentric member 28 is rotated. With rotation of eccentric member 28, a sleeve 30 is moved axially towards and away from member 26. With movement of sleeve 30, sleeves 32 are moved forwardly. As shown, threaded members 34 are threadably received at 36 within sleeves 32. When sleeves 32 move forwardly, they carry threaded members 34, and hence backing plate 22 and friction material 24 into contact with member 26.

To adjust the position of the friction material 24 for wear, gears 38 are fixed to rotate with sleeves 32. Idler gears 40 engage a central adjustment gear 42. An over-torque clutch 44 is shown for selectively driving central gear 42. When central gear 42 rotates, it rotates idler gears 40, and outer gears 38. When outer gears 38 rotate, sleeves 32 rotate, and the threaded connection 36 to threaded members 34 advances members 34, hence bringing friction material 24 closer to rotating member 26.

Figure 2:
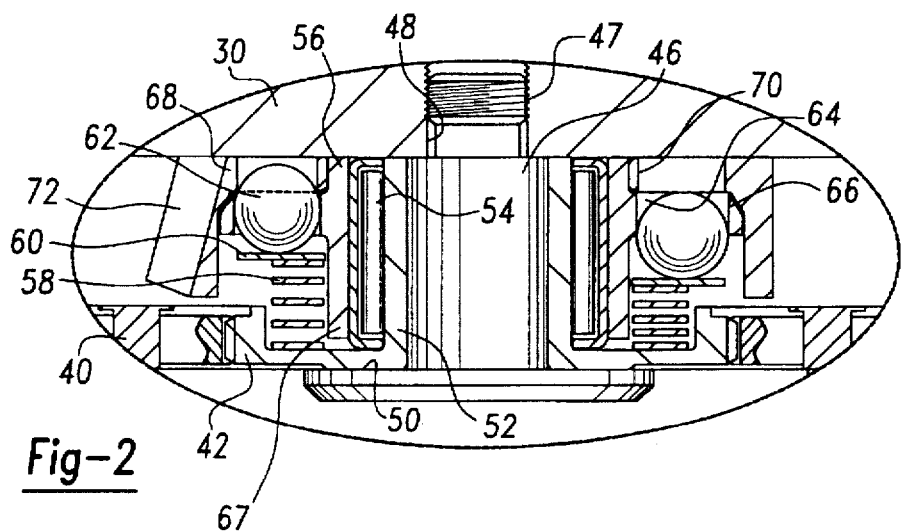
FIG. 2 shows details of the inventive clutch.

FIG. 2 shows certain details of the clutch 44. As shown, a central bolt 46 includes a threaded connection 47 within a bore 48 in sleeve 30. By tightening the bolt 46 within the bore 48, a spring load provided by the over-torque connection to be described below can be adjusted. As shown, a head 50 of bolt 46 abuts the central gear 42. An inner sleeve portion 52 of the central gear 42 rotates about bolt 46. A one way clutch 54, which may be conventional, allows rotation in one direction between an inner over-torque clutch member 56 and inner portion 52 of the central gear 42. When the eccentric 28 is rotated to bring the friction material 24 into contact with member 26, rotation may be transmitted by the one way clutch 54. However, when the eccentric member returns to its non-actuated position, the one-way clutch 54 does not reverse the rotation of the member 52. In this way, once adjustment does occur, it is not reversed when the brake returns to its non-actuated position.

The inventive aspects of this Application relate to over-torque clutch 44 which is positioned radially outwardly of the one-way clutch 54. As shown, an inner over-torque clutch member 56 is positioned radially inwardly of a spring 58, which may be a wave spring. Spring 58 applies an axial bias force to a washer 60. Washer 60 abuts one end of a plurality of balls 62. Balls 62 slide within a plurality of bores 64 in a disc 66 which extends radially outwardly of a sleeve portion 67 of inner over-torque clutch member 56. Although only two balls 62 are shown, several additional balls are preferably spaced circumferentially. Balls 62 can move through the bores 64 under the influence of the spring 58. An outer over-torque clutch member 68 includes bores 70. The inner diameter of the bore 64 is slightly greater than the outer diameter of the ball 62 such that the ball 62 can slide through the bore 64 between the torque transmission position shown on the left hand side of FIG. 2, and to a non-rotation transmission position shown on the right hand side.

Bores 70, on the other hand, have an inner diameter which is less than the outer diameter of balls 62. Thus, when the over-torque clutch members 68 and 56 are in a position wherein torque is to be transmitted, the balls 62 are forced into the bore 70, and abut an end face of the bore. The balls 62 are now received in both bores 70 and bore 64. The balls transmit rotation between the inner torque member 56 and the outer torque member 68. As shown, gear teeth 72 are formed at an outer peripheral surface of the outer torque member 68.

Figure 3A:
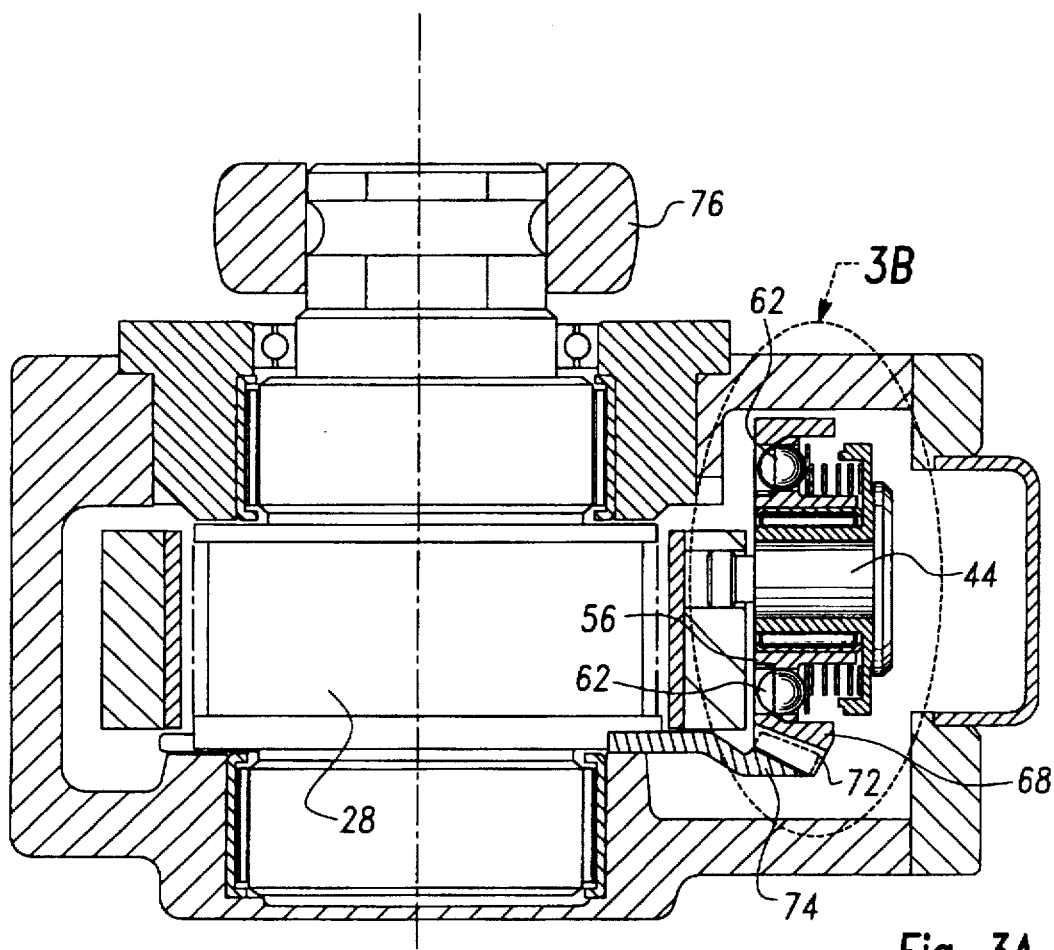
FIG. 3A shows the inventive clutch in a position to transmit rotation.

As shown in FIG. 3A, and adjustment member 74 rotates with rotation of the eccentric member 28. Lever 76 is utilized to rotate the eccentric member 28 to actuate the brake. Rotation of adjustment member 74 drives gear teeth 72 to rotate outer over-torque clutch member 68. If the balls 62 remain in position shown to the left hand side of FIG. 3A, this rotation then results in rotation of inner over-torque clutch member 56, and hence adjustment of the position of the members 34, as explained in greater detail above.

However, in the event that the friction material 24 is brought into contact with the member 26, and yet the entire rotation stroke of the eccentric member 28 has not yet occurred, further rotation of the adjustment mechanism would be undesirable. Once friction material 24 has contacted the member 26, there is resistance to further rotation of the members 68 and 56. This resistance results in a reaction force from the surfaces defining the bore 70 against the end faces of the ball 62. As long as the spring force 58 exceeds those reaction forces, balls 62 remain in bores 70, rotation is transmitted between the members 68 and 56, and the adjustment mechanism advances the friction material 24. This is the FIG. 3A position.

Figure 3B:
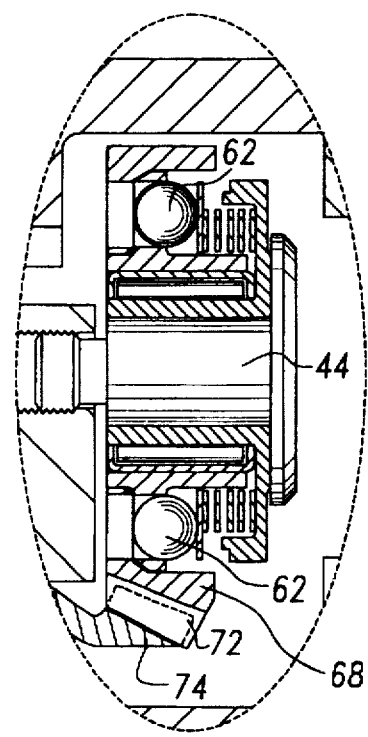
FIG. 3B shows the inventive clutch member having moved to allow relative rotation between the over-torque clutch members.

However, as shown in FIG. 3B when the reaction force between the surface which defines bore 70 and the end face of the ball 62 exceeds the spring force from spring 58, washer 60 moves against the spring force 58. Balls 62 move out of holes 70, and member 68 may rotate relative to member 56. The spring force may be adjusted by tightening or loosening bolt 44.

The use of the axial spring to apply the force to the balls results in a positive connection of the balls between members 68 and 56. In some applications this may be an improvement over the systems described above, wherein rotation is transmitted through frictional contact. Moreover, the use of the axial spring force results in less required radial space, which may be desirable in some applications.

Preferred embodiments of this invention have been disclosed, however, a worker of ordinary skill in the art would recognize that certain modifications would come within the scope of this invention. For that reason, the following claims should be studied to determine the true scope and content of this invention.

We claim:

1. A disc brake mechanism comprising:

a backing plate and friction material which may be selectively moved toward and away from a member to be stopped;

an actuation mechanism to be rotated, and to in turn move said backing plate toward and away from the member to be stopped;

an adjustment mechanism for advancing said backing plate closer to the member to be stopped to accommodate wear on said friction material;

said adjustment mechanism including a central gear, said central gear being associated with outer gears, rotation of said central gear causing rotation of said outer gears, said outer gears being adapted to advance said backing plate towards the member to be stopped upon receiving rotation from said central gear; and an over-torque clutch placed between an adjustment member associated with said actuation mechanism, and said central gear, said over-torque clutch including inner and outer over-torque members, which rotate about an axis and torque transmission members being forced into openings in both said inner and outer-torque members by an axial bias force acting along said axis to transmit rotation between said inner and outer over-torque members, and said torque transmission members being moveable out of said openings in at least one of said inner and outer over-torque members to allow said inner and outer over-torque members to rotate relative to each other such that rotation is not transmitted to said central gear.

2. A disc brake as recited in claim 1, wherein a bolt is secured to a structure associated with said actuation mechanism, said structure not rotating with said over-torque clutch, said bolt including a head providing a stop surface for said bias force such that the position of said bolt member may be adjusted to adjust the bias force.

3. A disc brake as recited in claim 2, wherein said bias force is provided by a spring, said spring having one end abutting against said bolt head.

4. A disc brake as recited in claim 3, wherein a second end of said spring abuts a washer, said washer forcing said torque transmission members away from said bolt head and into said openings.

5. A disc brake as recited in claim 4, wherein said torque transmission members are balls.

6. A disc brake as recited in claim 5, wherein said openings are holes, said balls being forced by said spring into said holes in said inner and outer over-torque members.

7. A disc brake as recited in claim 1, wherein said axial bias force is provided by at least one spring.

8. A disc brake as recited in claim 7, wherein said spring biases a washer, said washer biasing a plurality of torque transmission members to retain said torque transmission members in said holes in said inner and outer over-torque clutch member.

9. A disc brake as recited in claim 8, wherein said torque transmission members are balls.

10. A disc brake as recited in claim 1, wherein said torque transmission members are balls which are spaced circumferentially about a central axis of said inner over-torque member, and said balls transmitting rotation between said inner and outer over-torque members.

11. A disc brake as recited in claim 10, wherein said openings in said outer over-torque include a plurality of holes having an inner diameter which is less than an outer diameter of said balls such that said balls are only partially forced into said holes in said outer over-torque member.

12. A disc brake as recited in claim 10, wherein said inner over-torque member includes a radially outwardly extending disc, said disc including said openings, and said balls being received in said openings in said disc, said openings in said disc being holes having an inner diameter which is slightly greater than an outer diameter of said balls such that balls can move through said holes in said disc and into holes in said outer over-torque member.

13. A disc brake as recited in claim 1, wherein said adjustment member drives said outer over-torque member, and said torque transmission members then transmit rotation to said inner over-torque member.

14. A disc brake as recited in claim 1, wherein a one-way clutch is also positioned between said central gear and said over-torque clutch.

15. An adjustment mechanism for a disc brake comprising:

an adjustment member to be rotated upon rotation of a disc brake actuation member, an adjustment mechanism for advancing a disk brake backing plate upon rotation of the actuation mechanism of the disc brake;

said adjustment mechanism including a central gear, said central gear being associated with outer gears, rotation of said central gear causing rotation of said outer gears, said outer gears being adapted to advance a backing plate towards a member to be stopped upon receiving rotation from said central gear; and an over-torque clutch placed between said adjustment member and said central gear, said over-torque clutch including inner and outer over-torque members, balls being forced into holes in both said inner and outer over-torque members by a spring acting along an axis of rotation of said inner and outer over-torque members, rotation being transmitted between said inner and outer over-torque members when said balls are received in said holes in both said inner and outer over-torque members, and said balls being moveable out of said holes in at least one of said inner and outer over-torque members to allow said inner and outer over-torque members to rotate relative to each other such that rotation is not transmitted to said central gear.

16. An adjustment mechanism as recited in claim 15, wherein said inner over-torque member includes a radially outwardly extending disc, said disc including said holes, said balls being received in said holes, said holes in said inner over-torque clutch member having an inner diameter which is slightly greater than an outer diameter of said balls, such that said balls can move through said holes and into said holes in said outer over-torque members.

17. An adjustment mechanism as recited in claim 16, wherein said holes in said outer over-torque members have an inner diameter which is less than an outer diameter of said balls, and such that said balls are only partially forced into said holes in said outer over-torque member.

* * * * *